(12) United States Patent
Garcia Ramirez et al.

(10) Patent No.: US 11,542,850 B2
(45) Date of Patent: Jan. 3, 2023

(54) COMPOSITE EXHAUST ISOLATORS WITH REDUCED ABSORPTIVITY

(71) Applicant: Ford Global Technologies, LLC, Dearborn, MI (US)

(72) Inventors: Arturo Alberto Garcia Ramirez, Venustiano Carranza (MX); Ricardo Daniel Sanchez Lugo, Texcoco (MX); Alberto Hernandez Cruz, Tlalmanalco (MX); Victor Negrete Cortes, Mexico City (MX); Cindy Sofia Barrera-Martinez, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 16/799,074

(22) Filed: Feb. 24, 2020

(65) Prior Publication Data

US 2021/0262380 A1 Aug. 26, 2021

(51) Int. Cl.
*F16L 3/00* (2006.01)
*F01N 13/18* (2010.01)
*F16L 27/10* (2006.01)

(52) U.S. Cl.
CPC ...... *F01N 13/1822* (2013.01); *F16L 27/1004* (2013.01)

(58) Field of Classification Search
CPC ... F16L 27/1004; F16L 27/10; F01N 13/1822; F01N 13/16; F01N 13/1805; F16F 15/08
See application file for complete search history.

(56) References Cited

U.S. PATENT DOCUMENTS

| 4,584,330 | A | | 4/1986 | Wason | |
|---|---|---|---|---|---|
| 4,876,777 | A | * | 10/1989 | Chow | G03G 15/2057 156/154 |
| 9,470,134 | B2 | * | 10/2016 | Hirukawa | B60K 13/04 |
| 2006/0108037 | A1 | * | 5/2006 | Manne | B60C 17/06 152/158 |
| 2008/0173462 | A1 | * | 7/2008 | Whapham | H02G 7/125 174/42 |
| 2010/0151191 | A1 | * | 6/2010 | Thomas | B32B 15/18 156/247 |
| 2018/0187018 | A1 | | 7/2018 | Schmid et al. | |
| 2020/0139776 | A1 | * | 5/2020 | Rupflin | B60G 7/001 |

FOREIGN PATENT DOCUMENTS

| CN | 100335579 C | 9/2007 |
|---|---|---|
| CN | 104071092 A | 10/2014 |
| CN | 109369958 A | 2/2019 |
| CN | 109369985 A | 2/2019 |
| JP | 2018051987 A | 4/2018 |
| WO | 0210265 A1 | 2/2002 |

* cited by examiner

*Primary Examiner* — Amy J. Sterling
(74) *Attorney, Agent, or Firm* — Vincent Mastrogiacomo; McCoy Russell LLP (57) ABSTRACT

Methods and systems are provided for a coupling device. In one example, the coupling device may be formed of a composite material and positioned between an exhaust system and a vehicle chassis. The composite material may include aluminum particles dispersed in an elastomer matrix to reduce an overall thermal absorptivity of the composite material.

5 Claims, 3 Drawing Sheets

COMPOSITE EXHAUST ISOLATORS WITH REDUCED ABSORPTIVITY

FIELD

The present description relates to a dampening device for a vehicle.

BACKGROUND/SUMMARY

A vehicle exhaust system enables expulsion of gases from an engine which are generated during fuel combustion. The exhaust system may include a variety of passages, connectors, and fittings that are coupled to a chassis of the vehicle using dampening devices, or isolators. As hot exhaust gases flow through the exhaust system, components of the exhaust system may be subject to vibrations and elevated temperatures. The vibrations may be dampened by isolators made from an elastic, rebounding material, such as a type of elastomer. However, elastomers may be prone to degradation when exposed to high temperatures. Over time, continual flexing of the isolators, induced by oscillations propagating through the exhaust system, and proximity to and/or contact with hot surfaces may lead to weakening and cracking of the isolators.

Attempts to address degradation of dampening devices include using devices formed from a composite material. One example approach is shown by Chinese Patent No. CN109369958. Therein, aluminum nitride particles are included in an engine suspension rubber material. The aluminum nitride particles have high thermal conductivity, increasing conductivity of heat out of the rubber material and suppressing heat accumulation in the rubber material. Inhibiting heat accumulation may reduce thermally-induced macromolecular chain breakage of the rubber polymers and therefore improve resistance of the material to aging and fatigue.

However, the inventors herein have recognized potential issues with such systems. As one example, while increasing the thermal conductivity enhances heat conduction through the rubber material, the rubber polymers are nonetheless subjected to high temperatures. Increasing the thermal conductivity may reduce a residence time of heat within the rubber material but does not circumvent eventual thermal degradation of the rubber component of the composite material.

In one example, the issues described above may be addressed by a coupling device for a vehicle comprising a structure formed of a composite material, positioned between a vehicle chassis and an exhaust system and configured to absorb vibrations generated at the exhaust system, and wherein the composite material is a mixture of aluminum particles dispersed in an elastomer matrix. In this way, absorption of heat by the rubber component of the dampening device is suppressed, thus reducing heating of the rubber.

As one example, the coupling device may be formed of micron-scale aluminum particles dispersed in a rubber substrate. The rubber substrate may be a low cost rubber with higher thermal absorptivity than the aluminum particles. The aluminum particles, having a lower thermal absorptivity, may provide a barrier to heat transmitted to the coupling device via radiation from exhaust system components. Absorption of heat by the rubber substrate is thereby reduced, allowing the coupling device to remain structurally intact and effective towards dampening vibrations for a prolonged period of time.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-3 are shown approximately to scale

DETAILED DESCRIPTION

Figure 1:
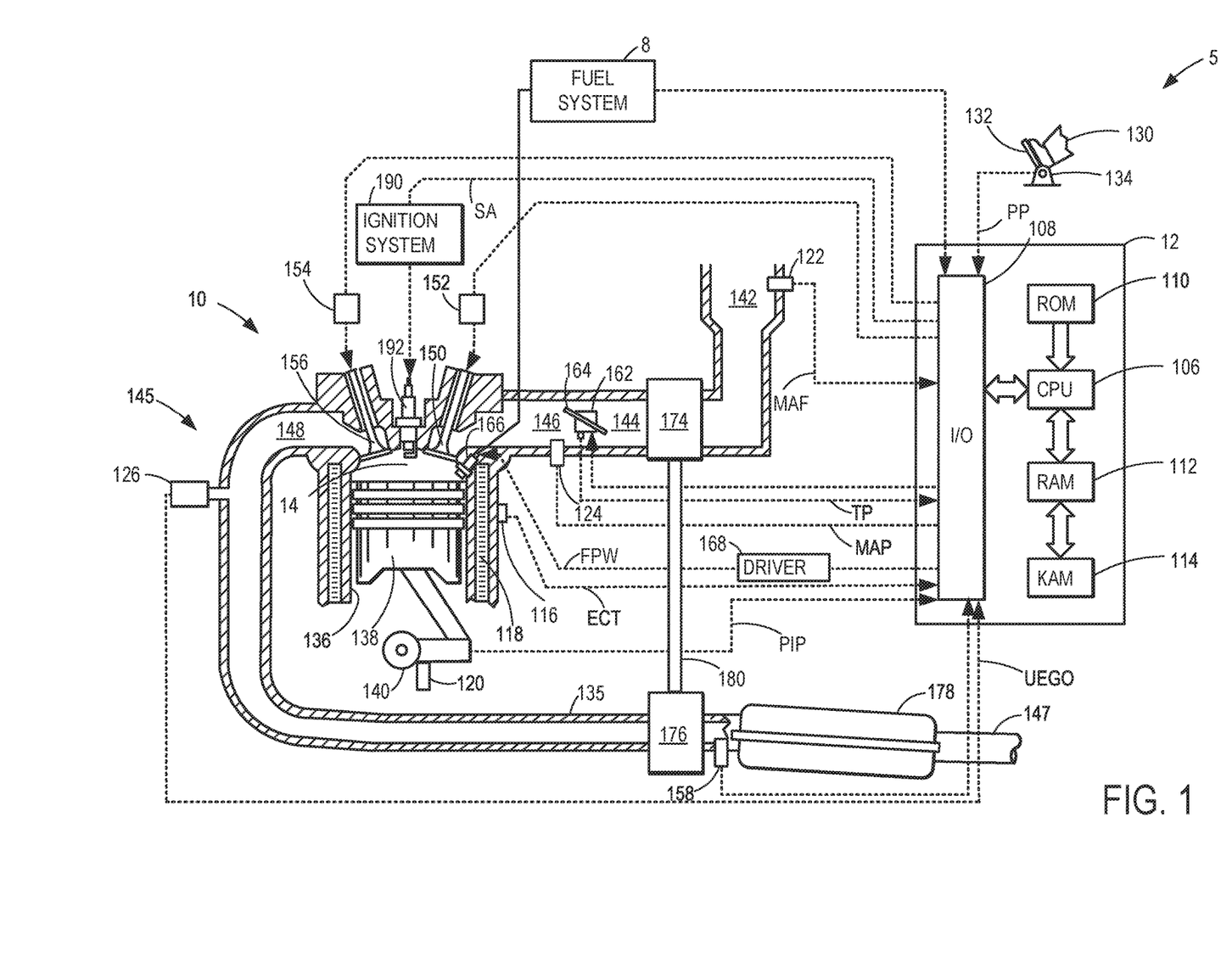
FIG. 1 shows a schematic diagram of an engine system, including an exhaust system.
Figure 2:
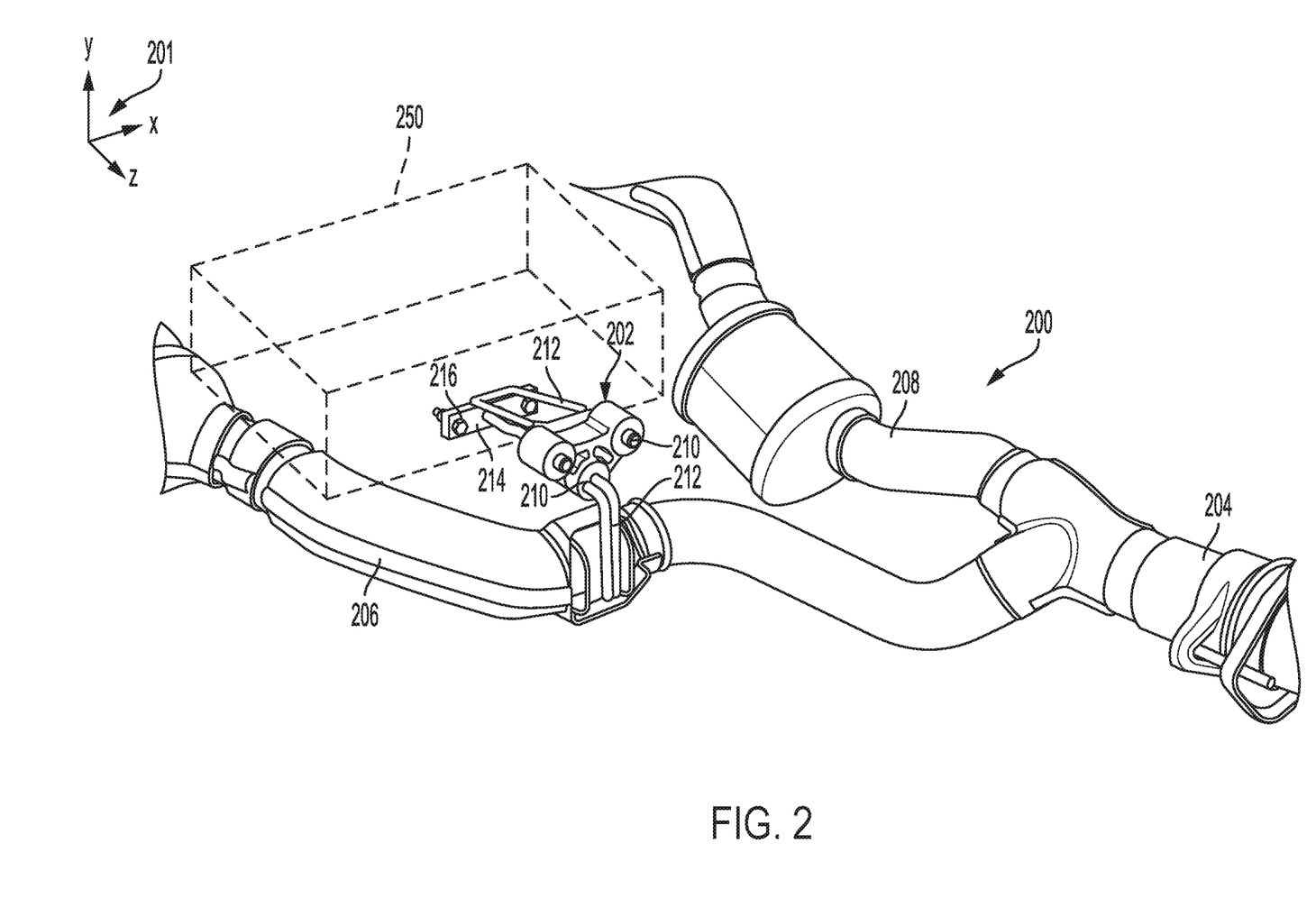
FIG. 2 shows an example of a coupling device which may be used to couple an exhaust system to a vehicle chassis.

The following description relates to dampening devices for vehicles. The dampening devices may also be coupling devices or couplers used to secure a vehicle exhaust system to a vehicle chassis. The dampening devices may further be exhaust isolators configured to inhibit propagation of oscillating motions from the exhaust system to the chassis. A schematic diagram of an engine system coupled to an exhaust system is shown in FIG. 1. As exhaust gases are directed through the exhaust system during engine operation, the flow of hot gases may cause the exhaust system components to oscillate at high frequencies. Such oscillations may demand use of couplers that are sufficiently flexible to absorb the vibrations, e.g., the dampening devices, and thereby reduce propagation of the vibrations to other vehicle regions. An example of a dampening device, or isolator is shown in FIG. 2 coupled to the exhaust system and depicted in a detailed view in FIG. 3. The isolator may be formed of an elastomer or rubber composite to enable effective dampening of vibrations and reduce thermally-induced degradation of a material of the isolator.

Figure 3:
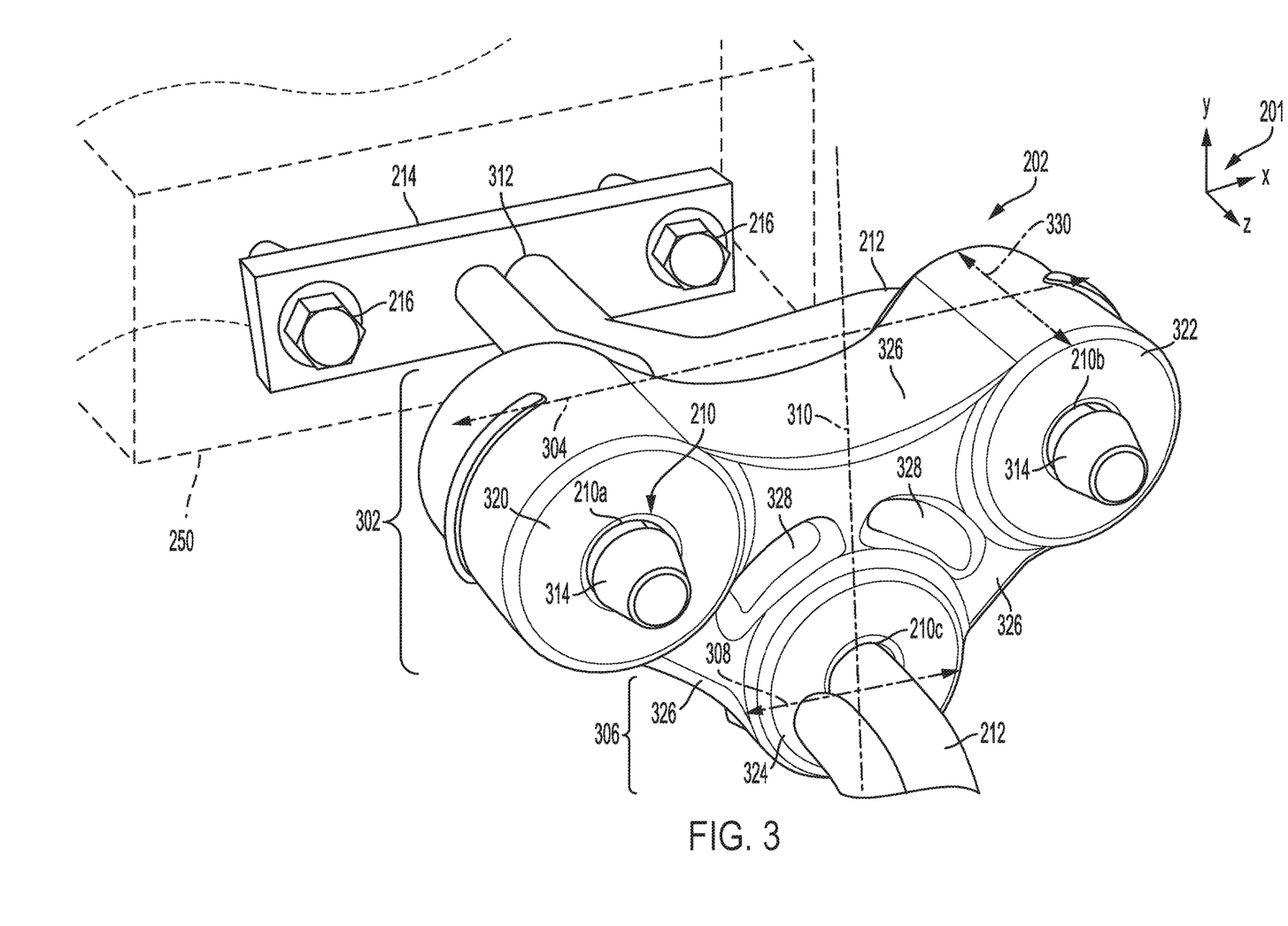
FIG. 3 shows a detailed view of the coupling device.

FIGS. 2-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Composite materials are material made from two or more constituent materials having different physical and/or chemical properties. When the materials are combined, they create a hybrid material with characteristics that are different from the parent materials. For example, elastomer composites may be a mixture of an elastomer substrate, such as natural rubber, chloroprene, ethylene propylene diene monomer, polysiloxane, etc., and a material with reinforcing qualities, such as higher strength, stiffness, heat resistance, etc. In one example, the reinforcing material may be a metal, such as aluminum. The metal may be dispersed into the elastomer substrate as particles or fibers, for example, such that the metal remains distinct within the elastomer matrix.

Use of composite materials may be driven by a demand for a particular material profile. For example, composite materials may be stronger, lighter, more durable, have a specific thermal property, or be less costly than the parent materials. As described herein, use of an elastomer or rubber composite to form exhaust system isolators may suppress thermal degradation of the isolators by inhibiting heat absorption at the isolators. Less heat is transferred from hot exhaust system components to the isolators by radiation, reducing heating of the rubber matrix of the isolators to high temperatures. Further details of the rubber composite isolators are provided below, with reference to FIGS. 2 and 3.

Turning now to the figures, FIG. 1 depicts an example of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel via a transmission (not shown).

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

An exhaust system 145 is coupled to cylinder 14 via a poppet valve 156. The exhaust system includes an exhaust manifold 148, an emission control device 178, and exhaust tail pipe 147. Exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO. Emission control device 178 may be a three-way catalyst, a NOx trap, various other emission control devices, or combinations thereof. In the example of FIG. 1, emission control device 178 is a three-way catalyst. The exhaust tail pipe 147 is positioned downstream of and coupled to emission control device 178 delivering exhaust gases that have been treated by emission control device 178 to the surrounding atmosphere.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

Each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14.

In an alternate example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a profile ignition pickup signal (PIP) from a Hall effect sensor 120 (or other type) coupled to crankshaft 140; throttle position (TP) from a throttle position sensor; signal UEGO from exhaust gas sensor 126, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, the controller may estimate the AFR of the exhaust gas based on a signal from the exhaust gas sensor 126 and used the inferred AFR to adjust a fuel injection rate at the cylinder 14.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

An exhaust system, such as the exhaust system 145 shown in FIG. 1, may include various runners and structures forming components such as an exhaust manifold, exhaust pipe, etc. The exhaust system may be attached to a vehicle chassis by flexible couplers. The flexible couplers may also be dampening devices, or isolators, that suppress transmission of vibrations from the exhaust system to the vehicle chassis. A flexible structure may refer to a structure formed of a material with pliable and rebounding properties, allowing the material to flex and deform when a force is applied and to return to an original shape when the force is removed. Thus, the material of the flexible couplers may have stiffness/durometer readings of 45-80 shore A.

During engine operation, hot exhaust gases may cause a temperature of the exhaust system to rise. The high temperature of the exhaust system may be transmitted to the flexible couplers by one of radiation from surfaces of the exhaust system and conduction through exhaust system hanger rods. Heating of the couplers may be predominantly attributable to radiation due to insulating properties of flexible materials used to form the couplers, such as rubber, and relatively small surface areas of the hanger rods in direct contact with the rubber.

Unlike materials of the exhaust system, the material of the couplers may be prone to thermal degradation upon exposure to radiated heat. Use of rubber with higher heat tolerance, such as silicone rubber, may suppress thermally-induced fatigue and weakening of the couplers but may incur high costs. Additionally, silicone rubber may have lower tear resistance than other lower cost types of rubber with lower heat tolerance. Both costs and thermal degradation of the couplers may be decreased, in one example, by forming the couplers from a rubber composite. The composite may include a first, low cost polymer or rubber material, such as ethylene propylene diene terpolymer (EPDM) to provide a matrix in which a second material with a lower thermal absorptivity may be supported. The second material may be a metal additive, such as aluminum, that absorbs less radiated heat from surfaces of the exhaust system than the first material. As such, the rubber composite overall may absorb less heat than the rubber material and may therefore be less prone to weakening due to exposure to radiated heat.

A flexible coupler for an exhaust system, e.g., an exhaust coupler 202, is shown in FIG. 2 coupled to an exhaust system 200. In one example, the exhaust system 200 may be the exhaust system 145 of FIG. 1. A set of references axes 201 are provided, indicating a y-axis, an x-axis, and a z-axis. The exhaust system may be positioned under a vehicle, e.g., below and along a vehicle chassis 250, depicted schematically as a box in FIGS. 2 and 3, and may have a plurality of passages and runners, including a main passage 204, a first branch 206 coupled to the main passage 204, and a second branch 208, separate from the first branch 206 and also coupled to the main passage 204. While the exhaust coupler 202 is depicted coupled to the first branch 206 in FIG. 2, other examples may include the exhaust coupler 202 coupled to the exhaust system 200 at any point along the exhaust system. For example, the exhaust coupler 202 may be positioned along the second branch 208 or along the main passage 204. Furthermore, other examples may include an exhaust system adapted with more than one exhaust coupler 202. For example, the exhaust system may have two exhaust couplers, each supporting a different regions of the exhaust system or an exhaust coupler located at each of the main passage 204, the first branch 206, and the second branch 208.

The exhaust coupler 202 may have a generally triangular outer geometry when viewed along the z-axis and may include a plurality of apertures 210 defining corners of the triangle where the plurality of apertures 210 may extend entirely through a depth, defined along the z-axis, of the exhaust coupler 202. In other words, the triangular shape of the exhaust coupler 202 may be formed by connecting geometric centers of the plurality of apertures 210. Various connecting structures 212, such as hangers, wires, rods, etc. may be fed through the plurality of apertures to connect a region of the exhaust system 200 supported by the exhaust coupler 202 to a point along the vehicle chassis 250. In other words, the exhaust coupler 202 may be located in a bridge between the exhaust system 200 and the vehicle chassis 250 where the bridge is formed by the connecting structures 212. The connecting structures 212 between the exhaust coupler 202 and the vehicle chassis 250 may be secured to the vehicle chassis by a plate 214 and fasteners 216.

The exhaust coupler 202 is shown in greater detail in FIG. 3. A width 304 of an upper region 302 of the exhaust coupler 202 may be greater than a width 308 of a lower region 306 of the exhaust coupler 202. The exhaust coupler 202 does not have any sharp corners, instead having only curved surfaces and may be a single, unitary, continuous structure without any joints or seams.

The upper region 302 may include two of the plurality of apertures 210, a first aperture 210a and a second aperture 210b. The first aperture 210a and the second aperture 210b are both depicted as circular openings and may be aligned along the x-axis. The first and second apertures 210a, 210b may have similar diameters and similar shapes, e.g., circular. However, in other examples, the first and second apertures 210a, 210b may have different diameters and/or different shapes. For example, the first apertures 210a may be ellipsoid while the second aperture 210b may be circular or the second aperture 210b may have a larger diameter than the first aperture 210a. Additionally, in some examples, the first and second apertures 210a, 210b may not be aligned along the x-axis and may instead be configured to match a positioning of the connecting structures 212 that is different from the positioning shown in FIGS. 2 and 3.

Connecting structures 212 may be secured at first ends 312 to the plate 214 and fed through each of the first and second apertures 210a, 210b, at second ends 314, thereby extending between the plate 214 and the exhaust coupler 202. The second ends 314 may include caps or plugs to inhibit sliding of the second ends 314 out and away from the first and second apertures 210a, 210b. The connecting structures 212 may be attached to the plate 214 by welding, for example, to form a rigid connection between the first ends 312 of the connecting structure 212 and the plate 214. The rigid connection may enable the exhaust coupler 202 to be maintained firmly in place relative to the vehicle chassis 250 (to which the plate 214 may be coupled via the fasteners 216) so that a position of the exhaust coupler 202 does not change even when subjected to vibrations and bouncing during vehicle operation.

A third aperture 210c of the plurality of apertures 210c may be centered about a center line 310 of the exhaust coupler 202, the center line 310 parallel with the y-axis. The third aperture 210c is located in the lower region 306 of the exhaust coupler 202 and may be positioned below, with respect to the y-axis, and between, with respect to the x-axis, the first and second apertures 210a, 210b. Connecting structures 212 coupling the exhaust coupler 202 to a region of an exhaust system, such as the first branch 206 of the exhaust system 200 of FIG. 2, may pass through the third aperture 210c. The connecting structures extending between the exhaust system and the exhaust coupler 202 may be rigid so that that a position of the exhaust coupler 202 relative of to the exhaust system is maintained.

Each of the apertures may be surrounded by a cylindrical structure. For example, the first aperture 210a is enclosed by a first cylinder 320, the second aperture 210b is enclosed by a second cylinder 322, and the third aperture 210c is enclosed by a third cylinder 324. The cylinders may be similar in shape and dimensions, e.g., inner and outer diameters, and length, etc. However, in other examples, the cylinders may have different dimensions or the plurality of apertures 210 may surrounding by structures with other geometries besides cylinders.

The first, second, and third cylinders 320, 322, 324, may be arranged in a triangular pattern with the first and second cylinder 322 aligned along the x-axis and equidistant from the center line 310 and the third cylinder 324 positioned below the first and second cylinders 320, 322, with respect to the y-axis, and centered about the center line 310. The cylinders are coupled to one another by a plurality of bridges 326 which may be connecting portions of the exhaust coupler 202 formed of curved surfaces extending between the cylinders, e.g., between the first and second cylinders 320, 322, between the second and third cylinders, 322, 324 and between the third and first cylinder 324, 320. The plurality of bridges 326 may be continuous with the cylinders and formed from a same material.

The exhaust coupler 202 may further include a pair of slots 328 positioned above and around the third cylinder 324. The pair of slots 328 may extend entirely or partially through a depth 330 of the exhaust coupler 202, the depth 330 defined along the z-axis. The pair of slots 328 may be configured to decrease an amount of material, and thereby a weight of the exhaust coupler 202. The pair of slots 328 may also enhance an ability of the exhaust coupler 202 to flex, deform, and rebound, e.g., return to an original shape, when subjected to oscillating motions.

It will be appreciated that the exhaust coupler 202 shown in FIGS. 2 and 3 is a non-limiting example of a dampening/coupler device used to couple the exhaust system to the vehicle chassis 250. Other examples may include variations in shape (e.g., rectangular, round, oval, etc.), size, number and positioning of apertures, number, positioning, and size of the slots, etc., without departing from the scope of the present disclosure.

As shown in FIG. 2, the exhaust coupler 202 may be positioned between the vehicle chassis 250 and the exhaust system 200. In this way, when vibrations are generated at the exhaust system 200, propagation of the vibrations to the vehicle chassis 250 is hindered by the exhaust coupler 202. The exhaust coupler 202, being formed of a more flexible, elastic material than the exhaust system 200, connecting structures 212 or vehicle chassis 250, may at least partially absorb the oscillations. In some instances, the exhaust coupler 202 may entirely dampen the vibrations so that the motion is not transmitted to the vehicle chassis 250, providing a more comfortable ride for vehicle passengers.

As described above, the material of the exhaust coupler 202 may be different from a material of the connecting structures 212 and a material of the exhaust system 200. For example, the exhaust system 200 may be formed from a durable, rigid, corrosion and heat resistant material such as stainless steel, aluminum, iron, etc. The connecting structures 212 may be formed from a similar or different material with similar properties to the material of the exhaust system 200. By forming vehicle components such as the exhaust system 200 and the connecting structures 212 from strong, heat tolerant materials, the components may withstand high temperatures without losing structural integrity. In addition, the exhaust system 200 may be able to tolerate exposure to exhaust gases and chemicals carried therein without succumbing to chemical degradation.

The exhaust coupler 202 may be configured to absorb vibrations and movement of the exhaust system 200 and inhibit transmission of the movement to the vehicle chassis which may otherwise add to undesirable noise, vibration, and harshness (NVH) detectable within a passenger compartment of the vehicle. As such the exhaust coupler 202 may be formed from a flexible material, such as a type of plastic, to allow the exhaust coupler 202 to flex and deform, thereby attenuating transmitted motion, and rebound to an original shape when the exhaust system is not vibrating. The material of the exhaust coupler 202 may also increase an ease with which the exhaust coupler 202 may be installed, e.g., by stretching or bending. In one example, the plastic may be a type of rubber. As the exhaust coupler 202 flexes, vibrations propagated to the exhaust coupler 202 from the exhaust system 200 via the connecting structures 212 are absorbed. In this way, the exhaust system 200 remains connected to the vehicle chassis without incurring additional NVH.

The flexible material, of the exhaust coupler 202, however, may be less heat tolerant than the material of the exhaust system and connecting structures 212. Exposure to high temperature, via both radiation and conduction from exhaust system components, may lead to embrittlement and cracking and/or rupture of the exhaust coupler 202. Furthermore, plastics used to form the exhaust coupler 202 may have relatively high thermal absorptivity. For example, the plastics may have an absorptivity between 0.7 and 1.0. As such, heat may be readily absorbed by the plastics, thereby accelerating thermal degradation of the exhaust coupler 202.

In one example, a lifetime of the exhaust coupler 202 may be prolonged by forming the exhaust coupler 202 from a composite material, as described above. The composite material may include a matrix formed from a low cost polymer, such as an elastomer, with a relatively high thermal absorptivity. The high thermal absorptivity of the elastomer may be tempered by incorporating a material into the elastomer matrix with a lower thermal absorptivity. One such material may be aluminum particles or aluminum alloy particles. By dispersing aluminum particles, having a low absorptivity of 0.2-0.4, into the elastomer matrix, a composite material with an overall lower absorptivity than the elastomer alone may be formed. As a result, a temperature of the exhaust coupler 202 may be maintained lower when exposed to radiating heat than when the exhaust coupler 202 is formed from the elastomer alone.

An amount of aluminum added to the elastomer may be relatively small to ensure that mechanical properties of the elastomer matrix, e.g., vibration absorption and elasticity, are retained. For example, the composite material may include 5 to 35% aluminum particles by volume. The aluminum particles may be dispersed in a matrix formed by an elastomer such as natural rubber, ethylene-propylene-diene-terpolymer (EPDM), vinyl-methy-silicone, or some other type of elastomer. Coupling agents may be added to the composite material to improve compatibility of the aluminum particle with the polymer. Furthermore, in order to increase dispersion of the aluminum particles into the elastomer matrix, the aluminum particles may be first suspended in oil prior to mixing with the matrix material. In some examples, the aluminum particles may be added as an additional filler to the elastomer matrix. Alternatively, the aluminum particles may partially or completely replace other, conventional fillers such as carbon black, silica, and mineral fillers.

The aluminum particles may, in one example, be repurposed from scrap or waste aluminum, thereby minimizing costs associated with incorporation of aluminum into the exhaust coupler. The particles with diameters of less than 100 microns may provide desirable ease of dispersion into the elastomer matrix with minimal disruption to mechanical properties of the matrix. However, the particles may have diameters of up to 600 microns in other examples.

In some examples, the aluminum particles may be dispersed evenly and homogeneously through the elastomer matrix. In other examples, the aluminum particles may be concentrated in an outer boundary region of the exhaust coupler. For example, the aluminum particles may be dispersed in a 2 mm thick layer at an outer surface of the exhaust coupler. Concentrating the aluminum particles along an outer boundary region of the exhaust coupler may further inhibit heat absorption at the exhaust coupler. In other words, the aluminum particles may form a shielding outer layer that deflects at least a portion of heat radiated from the exhaust system, thereby blocking heat conduction from an outer region of the exhaust coupler to an inner core of the exhaust coupler. Additionally, distributing the aluminum particles along the outer layer of the exhaust coupler may increase a likelihood that a desired mechanical and NVH performance of the exhaust coupler is maintained. However, fabricating the exhaust coupler with an aluminum particle concentration gradient that decreases from the outer layer to the inner core of the exhaust coupler may increase a complexity and/or cost of manufacturing.

In this way, an exhaust coupler may be configured to be more resistant to thermal degradation. By forming the exhaust coupler from a composite material incorporating an additive with a lower heat absorptivity than a matrix of the composite material, the exhaust coupler may absorb less heat from radiating exhaust system components while retaining desired mechanical properties of the matrix material. The matrix material may be a type of rubber and the additive may be aluminum particles, which are dispersed into the rubber matrix. The aluminum particles may be obtained from waste or scrap aluminum to maintain a low manufacturing costs. The resulting composite material may have an overall heat absorptivity between that of the matrix and the additive, thereby reducing heat transmitted to the exhaust coupler from adjacent exhaust system components. A dampening capacity of the exhaust coupler is thus maintained while a useful lifetime of the exhaust coupler is prolonged.

The technical effect of forming the exhaust coupler from the composite material is that an absorptivity of the exhaust coupler material is decreased while a flexibility and elasticity of the exhaust coupler is maintained.

As one embodiment a coupling device includes a structure formed of a composite material, positioned between a vehicle chassis and an exhaust system and configured to absorb oscillations generated at the exhaust system, and wherein the composite material is a mixture of aluminum particles dispersed in an elastomer matrix. In a first example of the coupling device, the elastomer matrix is a type of rubber with a thermal absorptivity of 0.7 to 1.0. A second example of the coupling device optionally includes the first example, and further includes, wherein the composite material has an overall thermal absorptivity less than the thermal absorptivity of the elastomer matrix. A third example of the coupling device optionally includes one or more of the first and second examples, and further includes, wherein the aluminum particles are formed of one of pure aluminum or an aluminum alloy. A fourth example of the coupling device optionally includes one or more of the first through third examples, and further includes, wherein the aluminum particles have a diameter of less than 100 microns and thermal absorptivity between 0.2 to 0.4. A fifth example of the coupling device optionally includes one or more of the first through fourth examples and further includes, wherein the aluminum particles absorb less heat radiated from the exhaust system than the elastomer matrix. A sixth example of the coupling device optionally includes one or more of the first through fifth examples and further includes, wherein a content of aluminum particles dispersed in the elastomer matrix is 5-35% by volume. A seventh example of the coupling device optionally includes one or more of the first through sixth examples and further includes, wherein the composite material has similar mechanical properties to the elastomer matrix. An eighth example of the coupling device optionally includes one or more of the first through seventh examples and further includes, wherein the composite material of the coupling device decreases transfer of vibrations from the exhaust system to the vehicle chassis.

In another embodiment, an exhaust isolator includes a composite material formed of aluminum particles dispersed in an elastomer, the elastomer having a higher thermal absorptivity than the aluminum particles, wherein the exhaust isolator is positioned between a vehicle chassis and an exhaust system and the composite material is configured to block transmission of vibrations from an exhaust system to a vehicle chassis while resisting heating via radiation from the exhaust system. In a first example of the exhaust isolator, the aluminum particles decrease a thermal absorptivity of the composite material and reduce a temperature of the elastomer when the exhaust isolator is exposed to the radiation. A second example of the exhaust isolator optionally includes the first example, and further includes, wherein the elastomer is a polymer with a stiffness/durometer reading of 45-80 shore A. A third example of the exhaust isolator optionally includes one or more of the first and second examples, and further includes, wherein the aluminum particles are distributed homogenously through the exhaust isolator. A fourth example of the exhaust isolator includes one or more of the first through third examples, and further includes, wherein the aluminum particles are concentrated in an outer boundary region of the exhaust isolator. A fifth example of the exhaust isolator includes one or more of the first through fourth examples, and further includes, wherein the aluminum particles are added as an additional filler to the composite material. A sixth example of the exhaust isolator includes one or more of the first through fifth examples, and further includes, wherein the aluminum particles are added as one of a partial and complete replacement for another filler.

In yet another embodiment, a vehicle includes a chassis, an exhaust system arranged below the chassis, and at least one coupling device coupling the exhaust system to the chassis and formed of an aluminum particle/rubber composite. In a first example of the vehicle, the at least one coupling device includes a plurality of apertures to interface with connecting structures extending between the chassis and the at least one coupling device and between the at least one coupling device and the exhaust system. A second example of the vehicle optionally includes the first example, and further includes wherein each of the plurality of apertures is surrounded by a cylindrical structure and wherein each cylindrical structure is connected to an adjacent cylindrical structure by a bridge. A third example of the vehicle optionally includes one or more of the first and second examples, and further includes, wherein the at least one coupling device includes slots extending through at least a portion of a depth of the flexible structure.

In another representation, a dampening device for an exhaust system includes a first material with a first absorptivity and a second material with a second, higher absorptivity, wherein a volumetric content of the second material is greater than a volumetric content of the first material and the first material is dispersed into the second material without altering mechanical properties of the second material.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle, comprising:
   a chassis;
   an exhaust system arranged below the chassis; and
   at least one coupling device coupling the exhaust system to the chassis and formed of an aluminum particle/rubber composite with aluminum particles dispersed in a rubber matrix;
   wherein the aluminum particles, having a thermal absorptivity lower than a thermal absorptivity of the rubber matrix, are concentrated in an outer boundary region of the at least one coupling device to form a heat shielding layer at an outer surface of the at least one coupling device.

2. The vehicle of claim 1, wherein the at least one coupling device includes a plurality of apertures to interface with connecting structures extending between the chassis and the at least one coupling device and between the at least one coupling device and the exhaust system.

3. The vehicle of claim 2, wherein each of the plurality of apertures is surrounded by a cylindrical structure and wherein each cylindrical structure is connected to an adjacent cylindrical structure by a bridge.

4. The vehicle of claim 3, wherein the at least one coupling device includes slots extending through at least a portion of a depth of the at least one coupling device.

5. The vehicle of claim 1, wherein the thermal absorptivity of the aluminum particles is between 0.2 to 0.4, and wherein the thermal absorptivity of the rubber matrix is greater than 0.4.

* * * * *